US012282055B2

(12) United States Patent
Jacob et al.

(10) Patent No.: US 12,282,055 B2
(45) Date of Patent: Apr. 22, 2025

(54) MAGNETO-ELECTRIC SENSOR FOR HARDWARE TROJAN DETECTION

(71) Applicant: UNIVERSITY OF SOUTHERN CALIFORNIA, Los Angeles, CA (US)

(72) Inventors: Ajey Jacob, Los Angeles, CA (US); Akhilesh Jaiswal, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 182 days.

(21) Appl. No.: 17/922,542

(22) PCT Filed: Apr. 29, 2021

(86) PCT No.: PCT/US2021/029827
§ 371 (c)(1),
(2) Date: Oct. 31, 2022

(87) PCT Pub. No.: WO2021/222521
PCT Pub. Date: Nov. 4, 2021

(65) Prior Publication Data
US 2023/0176111 A1   Jun. 8, 2023

Related U.S. Application Data

(60) Provisional application No. 63/017,229, filed on Apr. 29, 2020.

(51) Int. Cl.
*G01R 31/28*   (2006.01)
*G01K 7/36*   (2006.01)
(Continued)

(52) U.S. Cl.
CPC .......... *G01R 31/2851* (2013.01); *G01K 7/36* (2013.01); *G01R 15/207* (2013.01); *G01R 19/0092* (2013.01); *G06F 21/71* (2013.01)

(58) Field of Classification Search
CPC .............. G01R 31/2851; G01R 15/207; G01R 19/0092; G01K 7/36; G06F 21/71;
(Continued)

(56) References Cited

U.S. PATENT DOCUMENTS

| 7,241,631 B2 | 7/2007 | Huai et al. |
| 8,724,380 B1 | 5/2014 | Zhou et al. |

(Continued)

FOREIGN PATENT DOCUMENTS

| EP | 2589974 A2 | 5/2013 |
| KR | 10-2014-0136340 | 6/2014 |

OTHER PUBLICATIONS

Cozzi, M. et al., "Thermal Scans for Detecting Hardware Trojans, International Workshop on Constructive Side-Channel Analysis and Secure Design," COSADE (2018), 18 pgs.
(Continued)

*Primary Examiner* — Christopher P McAndrew
*Assistant Examiner* — Zannatul Ferdous
(74) *Attorney, Agent, or Firm* — Brooks Kushman P.C.

(57) ABSTRACT

A sensing circuit for detecting hardware trojans in a target integrated circuit is provided. The sensing circuit includes an array of magnetic tunnel junction circuits where each magnetic tunnel junction circuit including one or more magnetic tunnel junctions. Characteristically, each magnetic tunnel junction circuit configured to provide data for and/or determine a temperature map or a current map of the target integrated circuit.

32 Claims, 10 Drawing Sheets

(51) Int. Cl.
  *G01R 15/20* (2006.01)
  *G01R 19/00* (2006.01)
  *G06F 21/71* (2013.01)
(58) Field of Classification Search
  CPC ... G11C 11/1675; G11C 7/24; G11C 11/1673; G11C 11/1695; G11C 11/1659; G11C 11/5607
  See application file for complete search history.

(56) References Cited

U.S. PATENT DOCUMENTS

| | | | |
|---|---|---|---|
| 8,750,065 | B2 | 6/2014 | Merkel et al. |
| 2003/0156448 | A1* | 8/2003 | Hidaka ............... G11C 8/08 365/171 |
| 2006/0081497 | A1 | 4/2006 | Knudsen |
| 2007/0076330 | A1 | 4/2007 | Chung et al. |
| 2012/0031479 | A1* | 2/2012 | Kress ............. H01L 31/022483 257/E31.13 |
| 2016/0079520 | A1* | 3/2016 | Park ..................... G11C 11/161 257/421 |
| 2018/0156672 | A1 | 6/2018 | Wang et al. |
| 2018/0166627 | A1* | 6/2018 | Kim ........................ H01F 41/18 |
| 2019/0347416 | A1* | 11/2019 | Lacaze .............. G01R 31/2884 |
| 2021/0295915 | A1* | 9/2021 | Jaiswal .............. G11C 11/1675 |

OTHER PUBLICATIONS

Supon, T.M. et al., "On-Chip Magnetic Probes for Hardware Trojan Prevention and Detection," IEEE Transactions on Electrogmagnetic Compatability, v. 63, n. 2, 2021, pp. 353-364.
International Search Report & Written Opinion dated Aug. 5, 2021 for PCT Appn. No. PCT/US21/29827, 15 pgs.
EP Search Report dtd Apr. 18, 2024 for EP Appn. No. 21796607.6, 23 pgs.
Taheri, S. et al. "Security Protection for Magnetic Tunnel Junction," Cornell Univ. Library, Apr. 27, 17, pp. 1-6.

* cited by examiner

MAGNETO-ELECTRIC SENSOR FOR HARDWARE TROJAN DETECTION

CROSS-REFERENCE TO RELATED APPLICATIONS

This application is the U.S. national phase of PCT Appln. No. PCT/US2021/029827 filed Apr. 29, 2021, which claims the benefit of U.S. provisional application Ser. No. 63/017,229 filed Apr. 29, 2020, the disclosures of which are hereby incorporated in their entirety_by reference herein.

TECHNICAL FIELD

In at least one aspect, the present invention relates to a method and device for detecting hardware trojans is provided.

BACKGROUND

Although advantageous, run-time hardware trojan detection techniques have been severely limited due to associated circuit complexity, area overhead, and limited IC mapping resolution. Examples of prior art methods for detecting hardware trojans include side-channel finger-printing for creating a golden benchmark, synchrotron X-ray based reconstruction of a chip, use of IR cameras for thermal mapping of a chip, use of thermal CMOS sensors for on-chip monitoring, and use of CMOS current sensors for on-chip monitoring.

Since hardware trojans are embedded in an integrated circuit, they are hard to detect and impede the security of the integrated circuits.

SUMMARY

In at least one aspect, a sensing circuit for detecting hardware trojans in a target integrated circuit is provided. The sensing circuit includes an array of magnetic tunnel junction circuits where each magnetic tunnel junction circuit including one or more magnetic tunnel junctions. Characteristically, each magnetic tunnel junction circuit configured to provide data for and/or determine a temperature map or a current map of the target integrated circuit.

In another aspect, a novel multi-modal method and related hardware for detecting hardware trojans is provided.

In another aspect, a method of using high dynamic range multi-modal magnetic tunnel junction (MTJ) based sensors for fine-grain mapping of a chip is provided.

In another aspect, multi-modal sensing significantly improves the robustness of the proposed scheme.

In another aspect, run-time sensing allowing continuous monitoring post-deployment of the chip is provided.

In another aspect, multi-modal analysis improves the accuracy of ML algorithms that could be used for Trojan detection.

In another aspect, an on-chip sensor grid consisting of arrays of semiconductor diodes and MTJs is provided.

In another aspect, an on-chip sensor grid consisting of arrays of semiconductor diodes and cascaded MTJs is provided.

In another aspect, an on-chip sensor grid consisting of arrays of semiconductor diodes and cascaded telegraphic MTJs In another aspect, an on-chip sensor grid consisting of arrays of semiconductor diodes and non-cascaded telegraphic MTJs In another aspect, an on-chip sensor grid consisting of arrays of semiconductor diodes and voltage-controlled magnetic anisotropy based MTJs In another aspect, a method of enabling multi-modal sensing (temperature and current) by using telegraphic MTJs is provided In another aspect, a method of enabling disturb free read for an integrated structure consisting of a semiconductor diode and MTJs is provided In another aspect, a method of improving the dynamic range of sensing using cascaded telegraphic MTJs is provided.

In another aspect, a method of enabling lower area on-chip sensors using an integrated structure consisting of a semiconductor diode and MTJs is provided.

In another aspect, magnetic tunnel junction circuits are placed on any back end of line metal layers including the first metal layer or the far backend of line metal layer.

In still another aspect, a detection system for detecting hardware trojans in a target integrated circuit is provided. The detection system includes a sensing circuit comprising an array of magnetic tunnel junction circuits. Each magnetic tunnel junction circuit includes one or more magnetic tunnel junctions. Each magnetic tunnel junction circuit is configured to provide data for and/or determine a temperature map or a current map of the target integrated circuit. A microprocessor system is in electrical communication with the sensing system. The microprocessor system configured to receive data from the sensing circuit for producing the temperature map or the current map.

Advantageously, the present invention can provide higher sensing resolution than the state of the art IR cameras (e.g., 2×-4× or higher than such cameras). Moreover, the present invention provides a sensing circuit having zero (e.g., minimal) leakage and low area overhead since the use of MTJ as a sensor implies no standby leakage. Moreover, diode-based circuits can significantly reduce area overhead.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time.

The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Throughout this application, where publications are referenced, the disclosures of these publications in their entireties are hereby incorporated by reference into this application to more fully describe the state of the art to which this invention pertains.

The term "hardware trojan" refers to any malicious modification of the circuitry of an integrated circuit or the inclusion of a malicious component therein.

Abbreviations:
"AP" means antiparallel.
"BEOL" means back end of line.
"GND" means ground.
"MTJ" means magnetic tunnel junction.
"P" means parallel.
"TMR" means tunnel magnetoresistance.
"VCMA" means voltage controlled magnetic anisotropy.
"VDD" or "Vdd" refers to a voltage, typically, a positive DC voltage. For example, this voltage can be 0.2-1 V for 28 nm to 2 nm nodes (e.g., 0.8V nominally for 12 nm and 0.65V nominally for 7 nm).

Figure 1A:
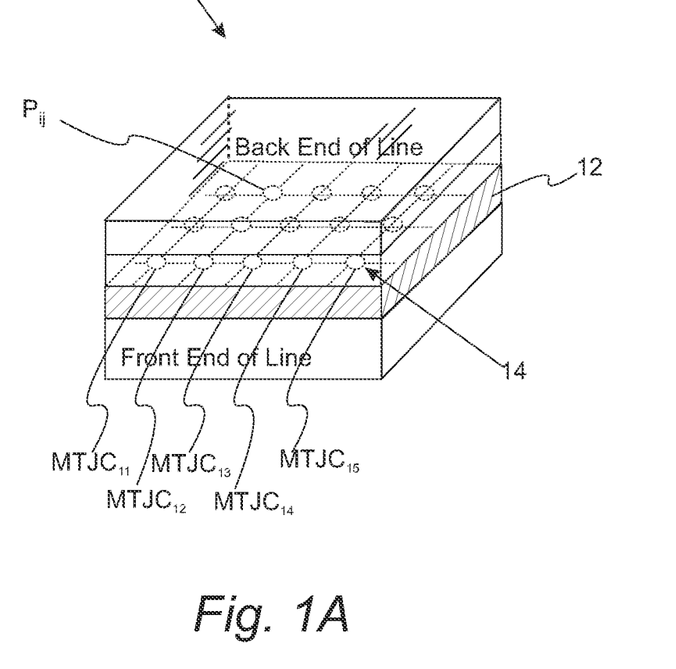
FIG. 1A. Schematic of hardware for detecting hardware trojans.

Depending on the technology nodes. FIG. 1A provides a schematic of a sensing circuit for detecting trojan hardware. Characteristically, electronic device 10 includes a mesh of MTJs as on-chip as temperature and current monitors. Sensing circuit 10 is incorporated within or positioned proximate to a target integrated circuit 12 (on a chip) for which the presence of a hardware trojan is to be detected. In this context, positioned proximate can mean touching the integrated circuit or within 0.1 to 1 mm.

In a refinement, the mesh of MTJs provides a mesh of nano-magnetic sensors in Back-End-of-Line for generating a thermal and current map of the chip. In this regard, electronic device 10 includes a grid 14 of BEOL MTJ circuits $MTJC_{ij}$ where i and j are integers labeling the MTJ circuits. The MTJ circuits are located at an array of positions Pij. Characteristically, each MTJ circuit can include a single MTJ or a plurality of MTJs along with additional electronic components for temperature or current sensing, as set forth below in more detail. Advantageously, area overhead for this design can be about 10% (for 2× resolution) and ~37% (for 4× resolution) at a 12 nm node for a 10 mm×10 mm chip. In a modified diode-based design, the area overhead is about 1%-5%. In a refinement, the MTJs are separated on the array by a distance corresponding to the minimum pitch of that metal layer, say for example, if the MTJs are placed in the first metal layers of an advanced processor such as finfet technology, the minimum pitch may be of the order of 70 to 80 nm. If it is placed at the far back end of line, the MTJs will be placed at the corresponding minimum pitch of that metal layer. It could also be placed at a farthest distance of 0.5 micron. The distance placed will also depends on the corresponding cell size.

As set forth above, each MTJ circuits $MTJC_{ij}$ includes one or more magnetic tunnel junction. The magnetic tunnel junction includes ferromagnets separated by a thin insulator. An example of a useful MTJ structure is FeCoB/MgO/FeCoB. As used in the present embodiments, the MTJs have an average size of less than 80 nm in radius if they are out-of-plane magnets and elliptical in shape if they are in-plane magnets. If elliptical, their aspect ratio may be less than 1:2 with one side being larger than the other side. Eg: 40×80 nm.

Figure 1B:
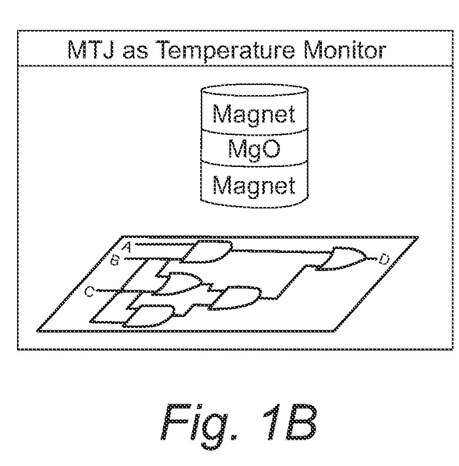
FIG. 1B. Overview schematic of application of hardware using temperature sensing.
Figure 1C:
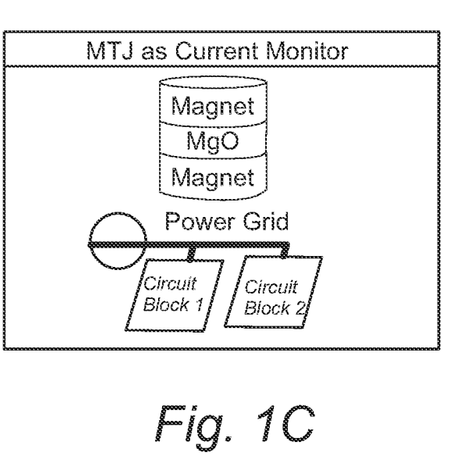
FIG. 1C. Overview schematic of application of hardware using current sensing.

FIG. 1B provides an overview schematic of application of hardware using temperature sensing. FIG. 1C provides an overview schematic of application of hardware using current sensing. In both of these variations, temperature or current map can be created since the positions Pij within the integrated circuit are known. Such maps plot the temperature or current over an area of the integrated circuit being studied. A map of the chip generated using MTJ based thermal and current sensors can then be used as input to Machine Learning (ML) algorithms like deep learning, Kalman filter based techniques, principal component analysis, etc. for trojan detection. Specifically, a multi-modal ML trojan detection algorithm that exploits uncorrelated and correlated data between thermal and current maps as well as the relative pixel intensity within each map with respect to other pixels can be employed for high accuracy trojan detection.

With respect to the sensing capability of circuit 10, MTJ parameters (e.g., TMR and telegraphic behavior) are known to be a strong function of temperature and of a current-induced magnetic field. In a refinement, thermal sensing MTJs can be placed in deep back-end-of-line for efficient temperature sensing. In another refinement, MTJs in the proximity of a power delivery network can be strategically placed for use as current sensors (by sensing the current-induced magnetic field). Advantageously, circuit 10 enables the use of seamlessly cascaded MTJs in the telegraphic switching regime for high dynamic range temperature and current sensing.

Figure 2A:
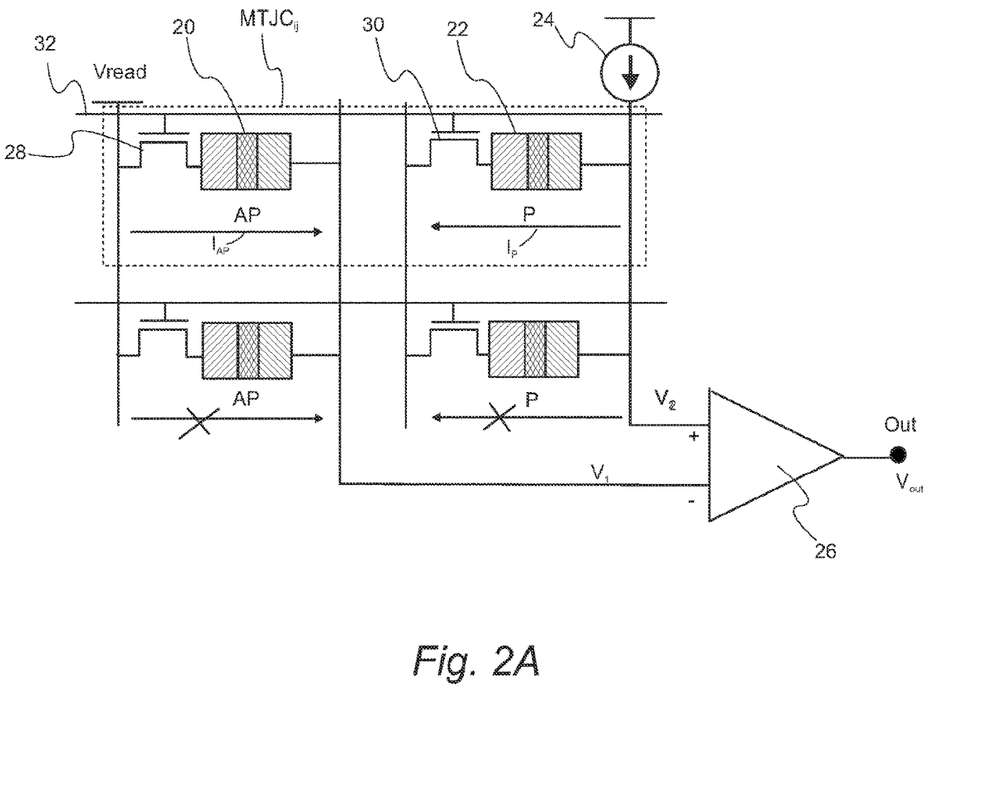
FIG. 2A. Schematic of TMR change temperature sensing circuit.
Figure 2B:
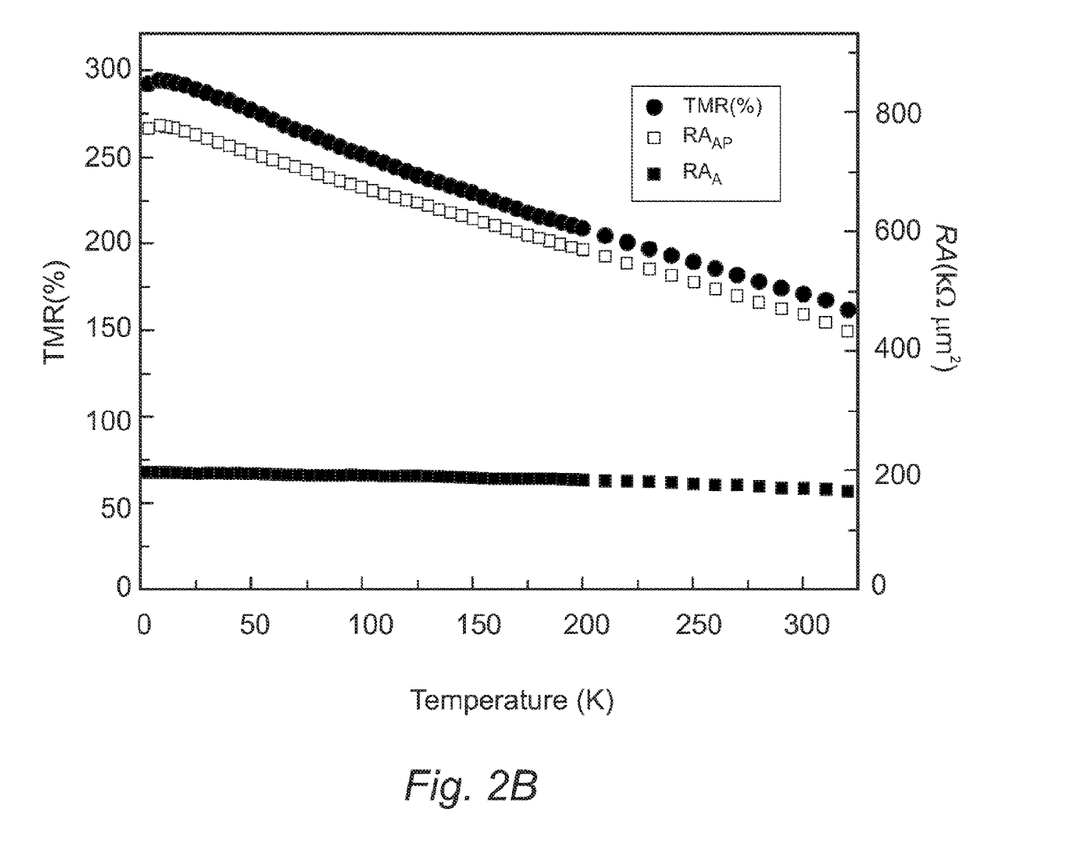
FIG. 2B. Plot of TMR and resistance versus temperature.

FIG. 2A provides a schematic of a TMR change temperature sensing circuit. Sensing circuit $MTJC_{ij}$ is used to determine the percent difference (TMR (%)) between the TMR for the off-state ($RA_{AP}$) and the on-state ($RA_P$) of the MTJ in the circuit. FIG. 2B provides plots of TMR, the off-state resistance $RA_{AP}$ and the on-state resistance $RA_P$ are functions of temperature. In this variation, each $MTJC_{ij}$ (positioned at positions $P_{ij}$) includes a pair of MTJs 20 and 22. In a refinement, MTJ 20 is set to the antiparallel state (AP), while MTJ 22 is set to the parallel state. Current $I_{AP}$ powered from voltage Vread flows through MTJ 20 while current $I_P$ from current source 24 flow through MTJ 22 to ground. Vread is a voltage, typically positive DC voltage. For example, this voltage can be 0.2-1 V for 28 nm to 2 nm nodes (e.g., 0.8V nominally for 12 nm and 0.65V nominally for 7 nm). A voltage $V_1$ from MTJ 20 and a voltage $V_2$ from MTJ 22 is provided to differential amplifier 26 to provide an output voltage $V_{out}$ that is used to monitor temperature and create a temperature map of the target integrated circuit. Selection transistors 28 and 30 are used to actuate a predetermined $MTJC_{ij}$ for sensing. In this regard, selection transistor 24 is in series with MTJ 20, and selection transistor 30 is in series with MTJ 22. A controller as described below can send control signals on control line 32 to the gates of selection transistors 28 and 30 to selectively activate a given sensing circuit MTJCij as desired.

Figure 3:
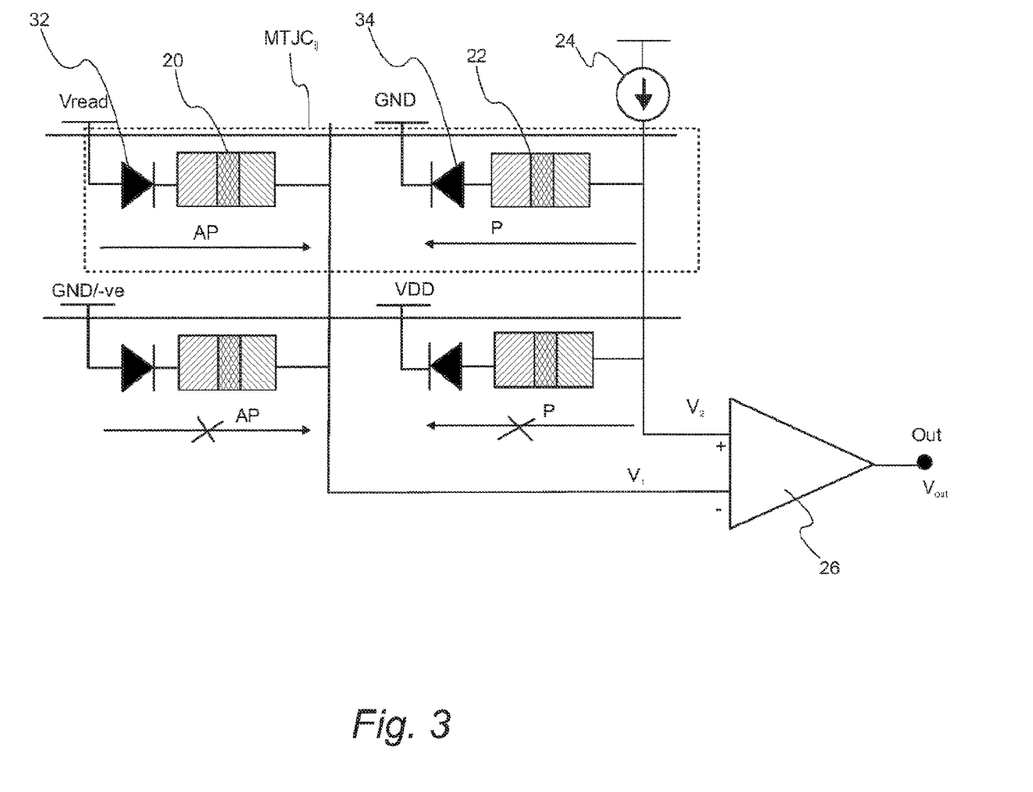
FIG. 3. Schematic of a sensing circuit with diodes for sensing temperature by measuring TMR change.

FIG. 3 provides a schematic of a sensing circuit with diodes for sensing temperature by measuring TMR change. This variation operates substantially the same as the circuit depicted in FIG. 2, but the transistors 24 and 26 replaced by diodes 34 and 36 with diode 34 in series with MTJ 20, and diode 36 is in series with MTJ 22. Since currents flow in only one direction, transistors can be replaced with BEOL diodes resulting in significant area savings. Therefore, diodes 34 and 36 are oriented to allow current to flow through MTJ 20 and MTJ 22, respectively.

Figure 4A:
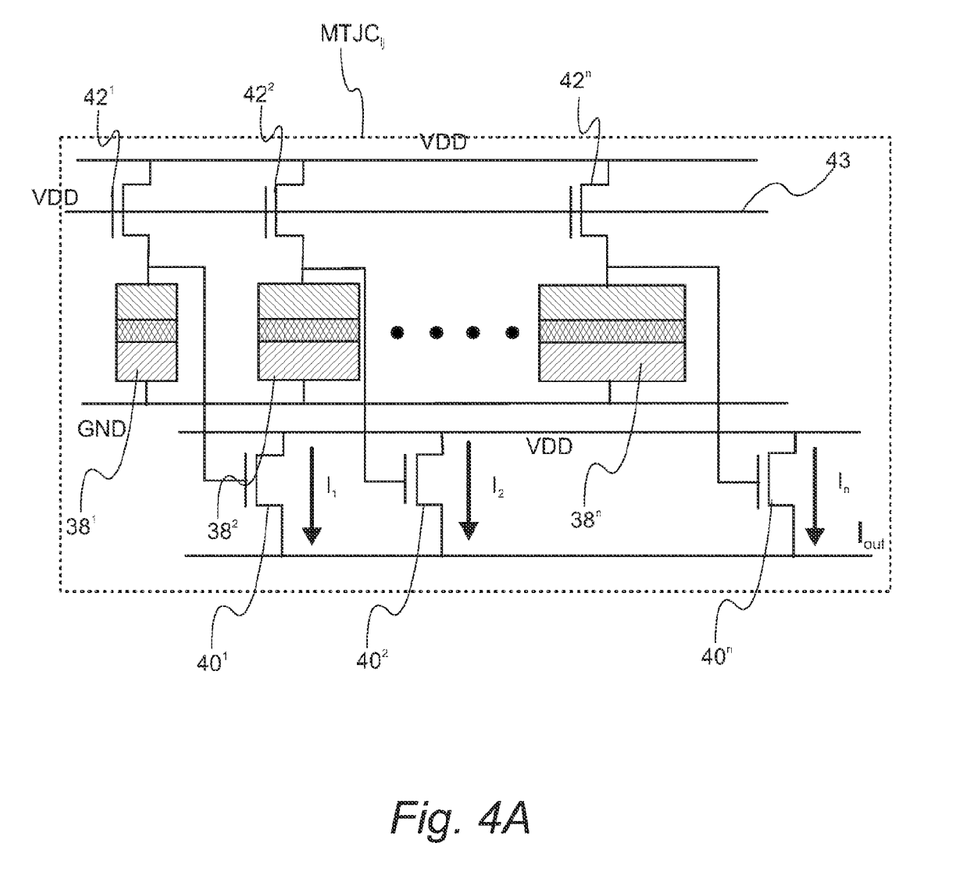
FIG. 4A. Schematic of a sensing circuit using telegraphic MTJs for high dynamic range temperature/current sensing.
Figure 4B:
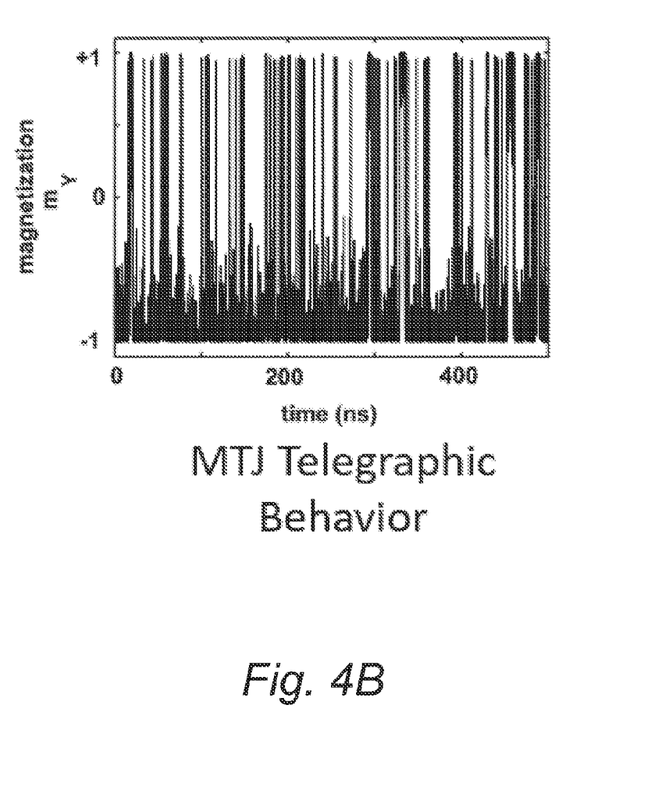
FIG. 4B. Plot of MTJ telegraphic behavior.

FIG. 4A provides a schematic of a circuit using cascaded telegraphic MTJs for high dynamic range temperature/current sensing. FIG. 4B provides a plot of MTJ telegraphic behavior. In this variation, sensing circuit $MTJC_{ij}$ (positioned at positions $P_{ij}$) includes a plurality of MTJs $38^n$ with a different energy barrier for each MTJ $38^n$ where n is an integer label. These different energy barriers can be achieved by the MTJs 38″ having increasing cross-section area. In a refinement, the MTJs have increasing energy-barriers such that a different temperature range can be mapped by each MTJ. A currently flows through each MTJ 38″ such that temperature or an inductively coupled magnetic field can change the probability of a transition from parallel state of the MTJ to the antiparallel state (or vice versa). The voltage output from the MTJ switches transistor 40‴ which allows current L to be provided to form output current $I_{out}$ used for the temperature sensing or current sensing. In this variation, the current through each transistor is added together to form output current $I_{out}$. Selection transistors 42″ are used to actuate a predetermined $MTJC_{ij}$ for sensing. A controller as described below can send control signals on control line 43 to the gates of selection transistors 42″ to selectively activate a given sensing circuit MTJCij as desired.

Figure 5:
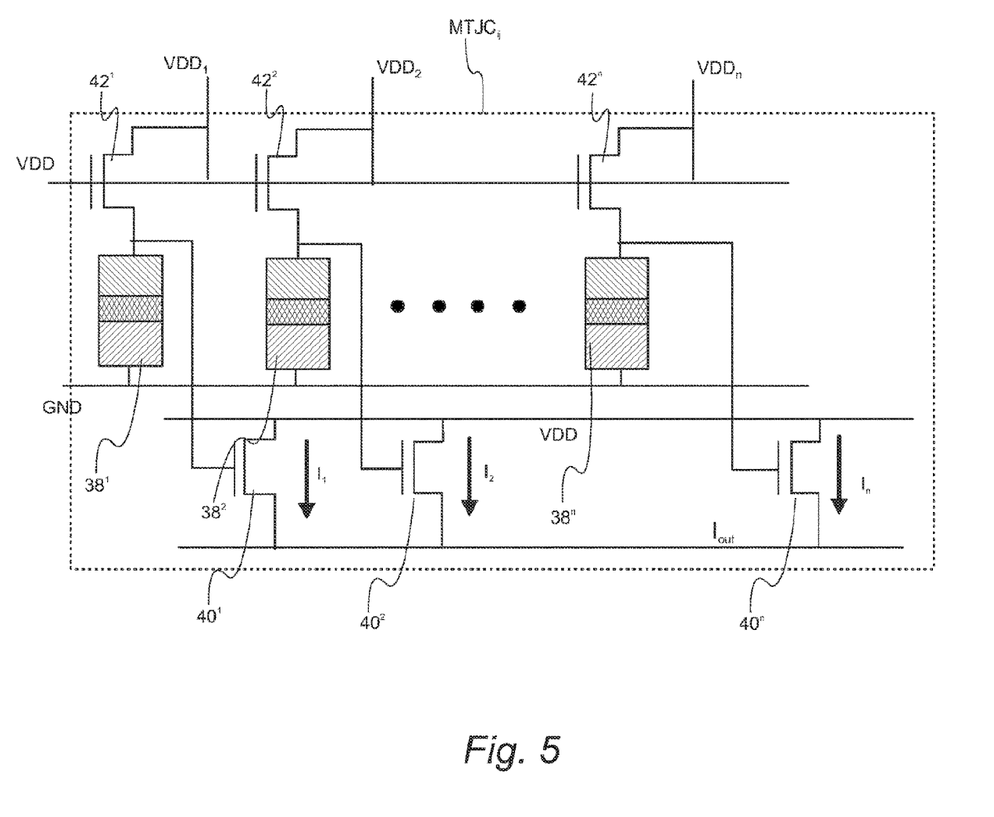
FIG. 5. Schematic of a sensing circuit using telegraphic VCMA-MTJ for high dynamic range temperature/current sensing.

FIG. 5 provides a schematic of a sensing circuit using telegraphic VCMA-MTJ for high dynamic range temperature/current sensing. This variation operates substantially the same as the circuit depicted in FIG. 4. However, $MTJC_{ij}$ (positioned at positions $P_{ij}$) uses a voltage-controlled magnetic anisotropy mechanism to create MTJs with increasing energy barrier. In this variation, a different voltage (e.g., increasing voltage) is applied to each MTJ 38″.

Figure 6:
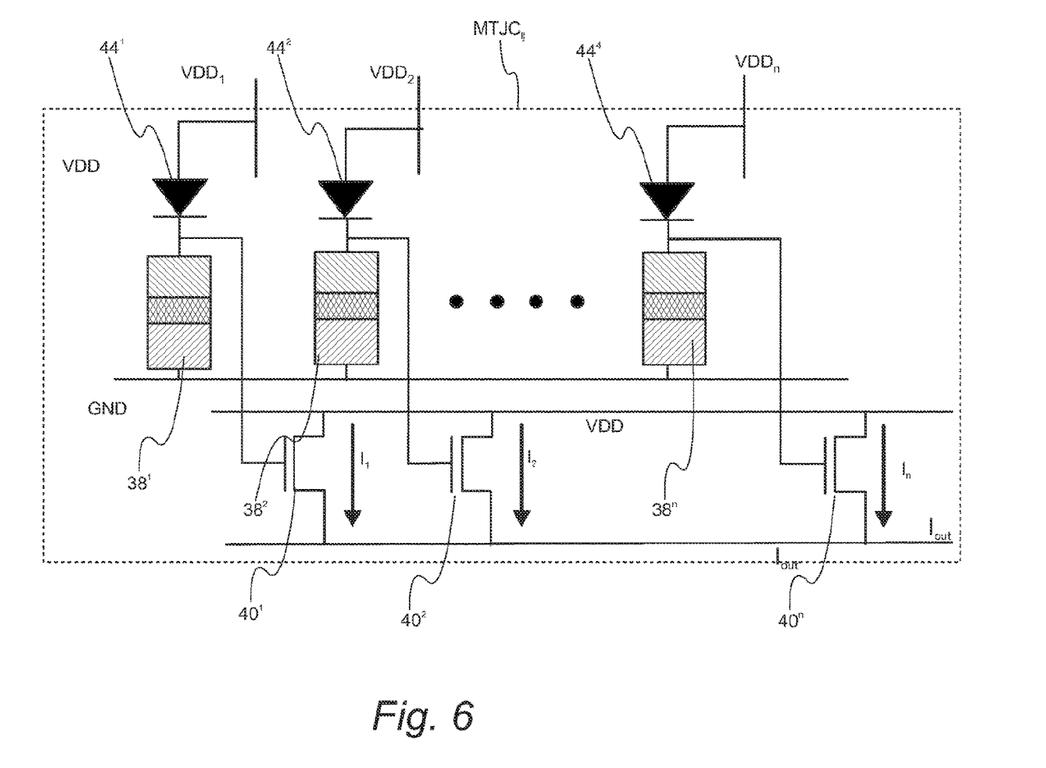
FIG. 6. Schematic of a sensing circuit using telegraphic c VCMA-MTJ high dynamic range temperature/current sensing with diodes.

FIG. 6 provides a schematic of a sensing circuit using telegraphic VCMA-MTJ high dynamic range temperature/current sensing with diodes. This variation operates substantially the same as the circuit depicted in FIG. 5, except that the selection transistors 42″ are replaced by diodes 44″.

Figure 7:
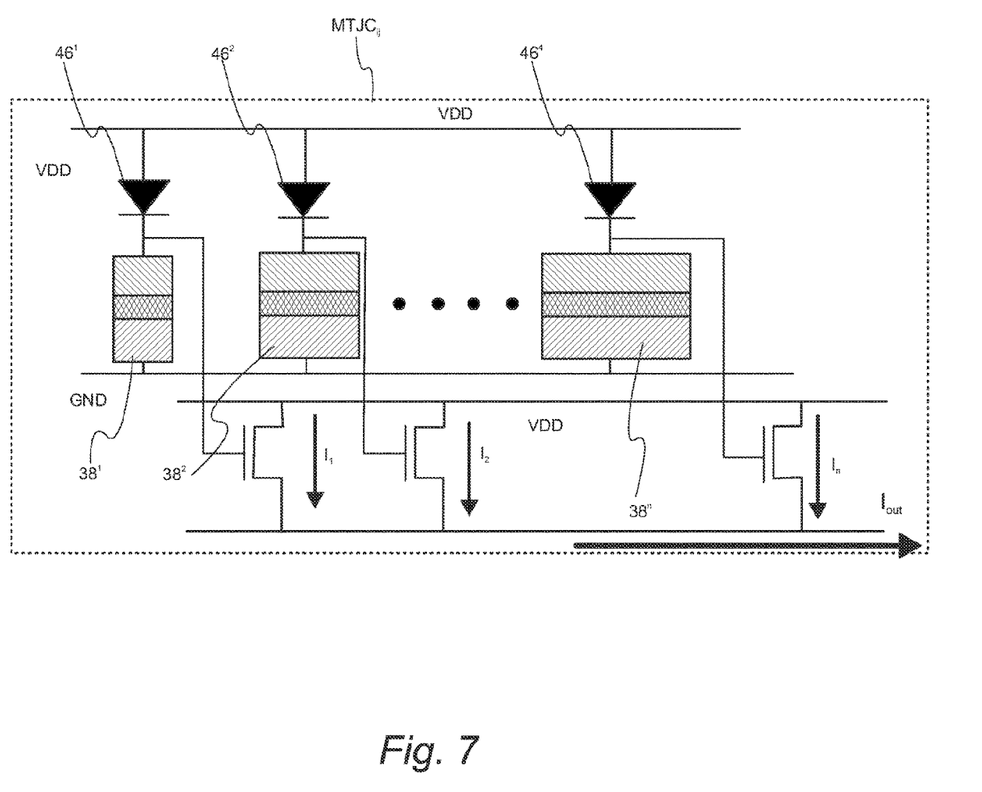
FIG. 7. Schematic of a sensing circuit using telegraphic MTJ high dynamic range temperature/current sensing with diodes.

FIG. 7 provides a schematic of a sensing circuit using telegraphic MTJ high dynamic range temperature/current sensing with diodes. This variation operates substantially the same as the circuit depicted in FIG. 4, except that the selection transistors 42″ are replaced by diodes 46″.

Figure 8:
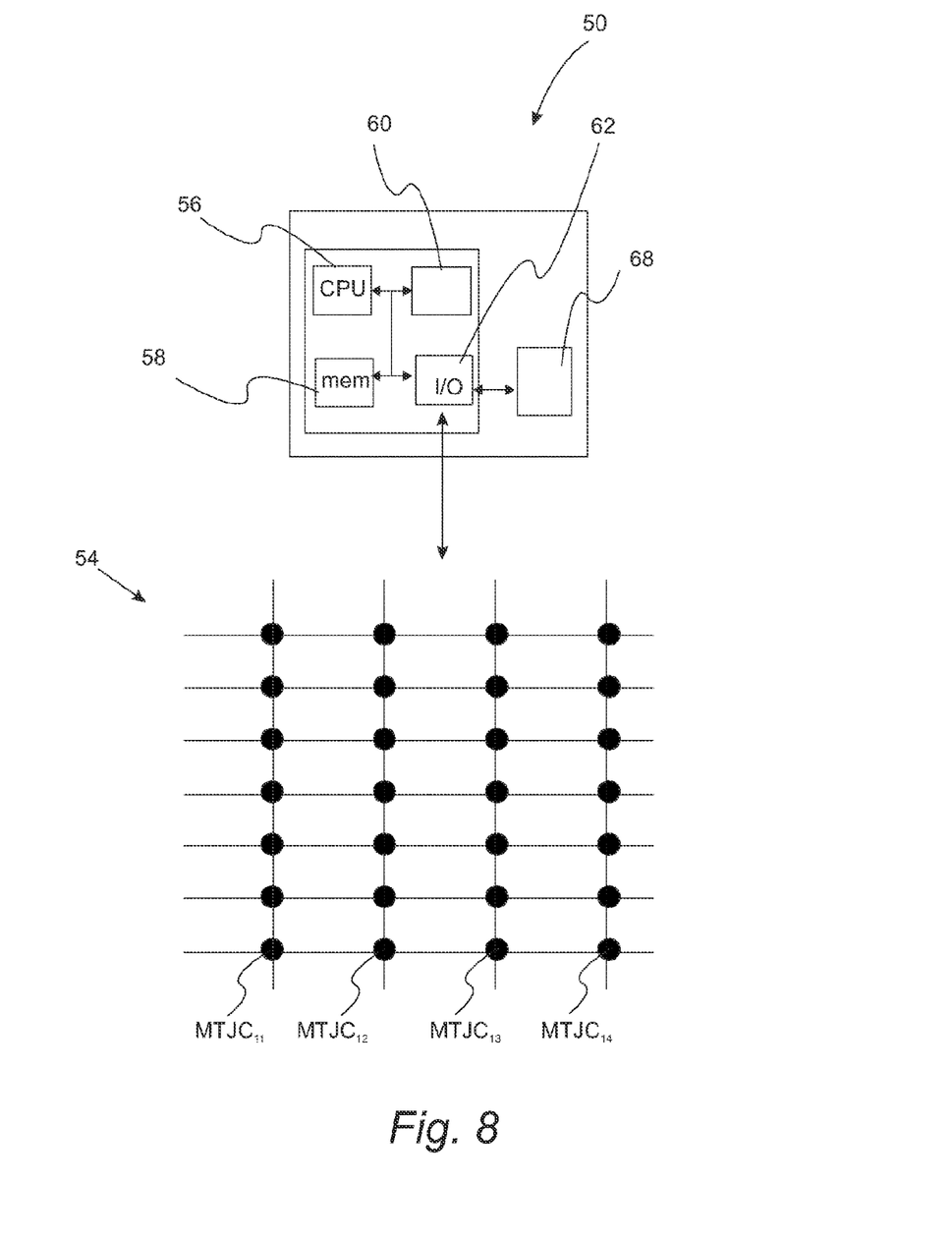
FIG. 8. Schematic of a detection system for detecting hardware trojans in a target integrated circuit

Referring to FIG. 8, a schematic of a detection system for detecting hardware trojans in a target integrated circuit is provided. Detection system 50 includes a microprocessor system 52 in electrical communication with sensing circuit 54. Sensing circuit 54 is of the designs set forth in FIGS. 1 to 7. In general, sensing circuit 54 includes an array of magnetic tunnel junction circuits MTJCij where i an j are integer labels. Each magnetic tunnel junction circuit MTJCij includes one or more magnetic tunnel junctions. Moreover, each magnetic tunnel junction circuit MTJCij is configured to provide data for and/or determine a temperature map or a current map of the target integrated circuit. Characteristically, microprocessor system 52 configured to receive data from the sensing circuit for producing the temperature map or the current map. Microprocessor system 52 includes computer processor 56 in communication with random access memory 58. Microprocessor system 52 can operate as a controller for sensing circuit 54. Computer processor 56 executes instructions for producing the current and/or the temperature maps. In a refinement, computer processor 56 executes the machine learning algorithms (e.g., a trained neural network) for identifying hardware Trojans from the current and/or the temperature maps or data thereof. Microprocessor system 52 also includes non-transitory memory 60 (e.g., DVD, ROM, hard drive, optical drive, etc.) which can have encoded instructions thereon for producing the current and/or the temperature maps. Typically, the encoded instructions will be loaded into random access memory 58 from non-transitory memory 60 and then executed by computer processor 56. Microprocessor system 52 also includes input/output interface 62 that can be connected to displayer 68, keyboard and mouse. Input/output interface 62 provides the electrical communication with sensing circuit 54. In a refinement, microprocessor system 52 is configured to send control signals to the selection transistors of FIGS. 2A and 4A.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sensing circuit for detecting hardware trojans in a target integrated circuit, the sensing circuit comprising:
an array of magnetic tunnel junction circuits, each magnetic tunnel junction circuit including one or more magnetic tunnel junctions, each magnetic tunnel junction circuit configured to provide data for and/or determine a temperature map or a current map of the target integrated circuit, wherein each magnetic tunnel junction circuit is used to determine a percent difference between a tunnel magnetoresistance for an off-state ($RA_{AP}$) and a tunnel magnetoresistance for an on state ($RA_p$) of a selected magnetic tunnel junction.

2. The sensing circuit of claim 1, wherein the sensing circuit is incorporated within or positioned proximate to the target integrated circuit.

3. The sensing circuit of claim 1, wherein the one or more magnetic tunnel junctions are positioned in deep back-end-of-line for efficient temperature sensing.

4. The sensing circuit of claim 1, wherein the one or more magnetic tunnel junctions are positioned in proximity of power delivery network for use as current sensors by sensing a current induced magnetic field.

5. The sensing circuit of claim 1, wherein each magnetic tunnel junction circuit includes a first magnetic tunnel junction and a second magnetic tunnel junction, the first magnetic tunnel junction being set in an antiparallel state and the second magnetic tunnel junction being set in a parallel state such that a first voltage from the first magnetic tunnel junction and a second voltage from the second magnetic tunnel junction is provided to a differential amplifier to provide an output voltage $V_{out}$ that is used to monitor temperature and create the temperature map of the target integrated circuit.

6. The sensing circuit of claim 5 further comprising a first selection transistor in series with the first magnetic tunnel junction and a second selection transistor in series with the second magnetic tunnel junction.

7. The sensing circuit of claim 5 further comprising a first diode in series with the first magnetic tunnel junction and a second diode in series with the second magnetic tunnel junction.

8. The sensing circuit of claim 1, wherein each magnetic tunnel junction circuit includes a plurality of cascaded telegraphic magnetic tunnel junctions for high dynamic range temperature/current sensing.

9. The sensing circuit of claim 8, wherein the plurality of cascaded telegraphic magnetic tunnel junctions includes magnetic tunnel junctions with increasing energy barriers.

10. The sensing circuit of claim 9, wherein each magnetic tunnel junction has an associated transistor that allows a current to be provided as an output.

11. The sensing circuit of claim 10, wherein each magnetic tunnel junction circuit includes a selection transistor associated with each magnetic tunnel junction in the plurality of cascaded telegraphic magnetic tunnel junctions.

12. The sensing circuit of claim 10, wherein each magnetic tunnel junction circuit includes a diode associated with each magnetic tunnel junction in the plurality of cascaded telegraphic magnetic tunnel junctions.

13. The sensing circuit of claim 10, wherein the sensing circuit uses telegraphic VCMA-MTJ for high dynamic range temperature/current sensing.

14. The sensing circuit of claim 13, wherein the magnetic tunnel junction circuit uses a voltage-controlled magnetic anisotropy mechanism to create magnetic tunnel junctions with increasing energy barrier.

15. The sensing circuit of claim 14, wherein a different voltage is applied to each magnetic tunnel junction circuit.

16. The sensing circuit of claim 15, wherein the different voltage is an increasing voltage.

17. The sensing circuit of claim 16, wherein each magnetic tunnel junction circuit includes a selection transistor associated with each magnetic tunnel junction in the plurality of cascaded telegraphic magnetic tunnel junctions.

18. The sensing circuit of claim 16, wherein each magnetic tunnel junction circuit includes a diode associated with each magnetic tunnel junction in the plurality of cascaded telegraphic magnetic tunnel junctions.

19. The sensing circuit of claim 1, wherein magnetic tunnel junction circuits are placed on any back end of line metal layers including a first metal layer or a far backend of line metal layer.

20. A detection system for detecting hardware trojans in a target integrated circuit, the detection system including:
   a sensing circuit comprising an array of magnetic tunnel junction circuits, each magnetic tunnel junction circuit including one or more magnetic tunnel junctions, each magnetic tunnel junction circuit configured to provide data for and/or determine a temperature map or a current map of the target integrated circuit; and
   a microprocessor system in electrical communication with the sensing circuit, the microprocessor system configured to receive data from the sensing circuit for producing the temperature map or the current map, wherein each magnetic tunnel junction circuit is used to determine a percent difference between a tunnel magnetoresistance for an off-state ($RA_{AP}$) and a tunnel magnetoresistance for an on state ($RA_p$) of a selected magnetic tunnel junction.

21. The detection system of claim 20, wherein the sensing circuit is incorporated within or positioned proximate to the target integrated circuit.

22. The detection system of claim 20, wherein the one or more magnetic tunnel junctions are positioned in deep back-end-of-line for efficient temperature sensing.

23. The detection system of claim 20, wherein the one or more magnetic tunnel junctions are positioned in proximity of power delivery network for use as current sensors by sensing a current induced magnetic field.

24. The detection system of claim 20, wherein each magnetic tunnel junction circuit includes a first magnetic tunnel junction and a second magnetic tunnel junction, the first magnetic tunnel junction being set in an antiparallel state and the second magnetic tunnel junction being set in a parallel state such that a first voltage from the first magnetic tunnel junction and a second voltage from the second magnetic tunnel junction is provided to a differential amplifier to provide an output voltage Vout that is used to monitor temperature and create the temperature map of the target integrated circuit.

25. The detection system of claim 24 further comprising a first selection transistor in series with the first magnetic tunnel junction and a second selection transistor in series with the second magnetic tunnel junction.

26. The detection system of claim 25, wherein the microprocessor system is configured to send control signals to the first selection transistor.

27. The detection system of claim 20, wherein each magnetic tunnel junction circuit includes a plurality of cascaded telegraphic magnetic tunnel junctions for high dynamic range temperature/current sensing.

28. The detection system of claim 27, wherein the plurality of cascaded telegraphic magnetic tunnel junctions includes magnetic tunnel junctions with increasing energy barriers.

29. The detection system of claim 28, wherein each magnetic tunnel junction has an associated transistor that allows a current to be provided as an output.

30. The detection system of claim 29, wherein each magnetic tunnel junction circuit includes a selection transistor associated with each magnetic tunnel junction in the plurality of cascaded telegraphic magnetic tunnel junctions.

31. The detection system of claim 30, wherein the microprocessor system is configured to send control signals to each selection transistor.

32. The detection system of claim 20, wherein magnetic tunnel junction circuits are placed on any back end of line metal layers including a first metal layer or a far backend of line metal layer.

* * * * *

UNITED STATES PATENT AND TRADEMARK OFFICE
CERTIFICATE OF CORRECTION

PATENT NO. : 12,282,055 B2
APPLICATION NO. : 17/922542
DATED : April 22, 2025
INVENTOR(S) : Ajey Jacob et al.

Page 1 of 1

It is certified that error appears in the above-identified patent and that said Letters Patent is hereby corrected as shown below:

In the Claims

Column 10, Lines 14-15, Claim 24:
After "differential amplifier to provide an output voltage"
Delete "Vout" and
Insert -- $V_{out}$ --.

Signed and Sealed this
Third Day of February, 2026

John A. Squires
*Director of the United States Patent and Trademark Office*